United States Patent
Gao et al.

(10) Patent No.: US 8,477,443 B2
(45) Date of Patent: Jul. 2, 2013

(54) PULSE WRITING FOR BIT PATTERNED AND CONTINUOUS MEDIA RECORDING

(75) Inventors: Kaizhong Gao, Eden Prairie, MN (US); Olle Gunnar Heinonen, Eden Prairie, MN (US); Jianhua Xue, Maple Grove, MN (US); Wenzhong Zhu, Apple Valley, MN (US)

(73) Assignee: Seagate Technology LLC, Cupertino, CA (US)

( * ) Notice: Subject to any disclaimer, the term of this patent is extended or adjusted under 35 U.S.C. 154(b) by 45 days.

(21) Appl. No.: 12/506,748

(22) Filed: Jul. 21, 2009

(65) Prior Publication Data

US 2011/0019300 A1 Jan. 27, 2011

(51) Int. Cl.
*G11B 5/09* (2006.01)
*G11B 5/03* (2006.01)

(52) U.S. Cl.
USPC ............................................. 360/51; 360/66

(58) Field of Classification Search
None
See application file for complete search history.

(56) References Cited

U.S. PATENT DOCUMENTS

| 5,687,036 | A | 11/1997 | Kassab |
| 5,801,910 | A | 9/1998 | Mallary |
| 5,820,769 | A * | 10/1998 | Chou ............................... 216/22 |
| 6,466,386 | B1 | 10/2002 | Dakroub |
| 6,493,161 | B1 * | 12/2002 | Elliott et al. .................... 360/46 |
| 6,650,493 | B2 | 11/2003 | Dakroub |
| 6,930,846 | B2 | 8/2005 | Nakamura |
| 2009/0237829 | A1* | 9/2009 | Ozawa et al. ................... 360/75 |

FOREIGN PATENT DOCUMENTS

JP 2003157507 A * 5/2003

* cited by examiner

*Primary Examiner* — Daniell L Negron
(74) *Attorney, Agent, or Firm* — Alan G. Rego; Westman, Champlin & Kelly, P.A.

(57) ABSTRACT

Data storage systems are provided. Data storage systems illustratively include a writing element and a recording medium. In some embodiments, the writing element generates first and second magnetization fields that respectively record first and second magnetization patterns to the recording medium. In some embodiments, the writing element is de-saturated between recording the first and second magnetization patterns.

12 Claims, 7 Drawing Sheets

PULSE WRITING FOR BIT PATTERNED AND CONTINUOUS MEDIA RECORDING

BACKGROUND

Data storage systems commonly include a writing element. The writing element generates a magnetic field that magnetically patterns a recording medium. In continuous media data storage systems, the recording medium commonly includes a continuous magnetic surface. In bit patterned media systems, the recording medium commonly includes individual, discrete magnetic media dots that are surrounded by a non-magnetic material.

One factor in determining the performance of a data storage system is the rate at which a writing element is able to generate a magnetic field or alter the polarity of a magnetic field. Higher rates generally correspond to better or higher performing data storage systems.

SUMMARY

Data storage systems are provided. Data storage systems illustratively include a writing element and a recording medium. In some embodiments, the writing element generates first and second magnetization fields that respectively record first and second magnetization patterns to the recording medium. In some embodiments, the writing element is de-saturated between recording the first and second magnetization patterns.

DETAILED DESCRIPTION

Figure 1:
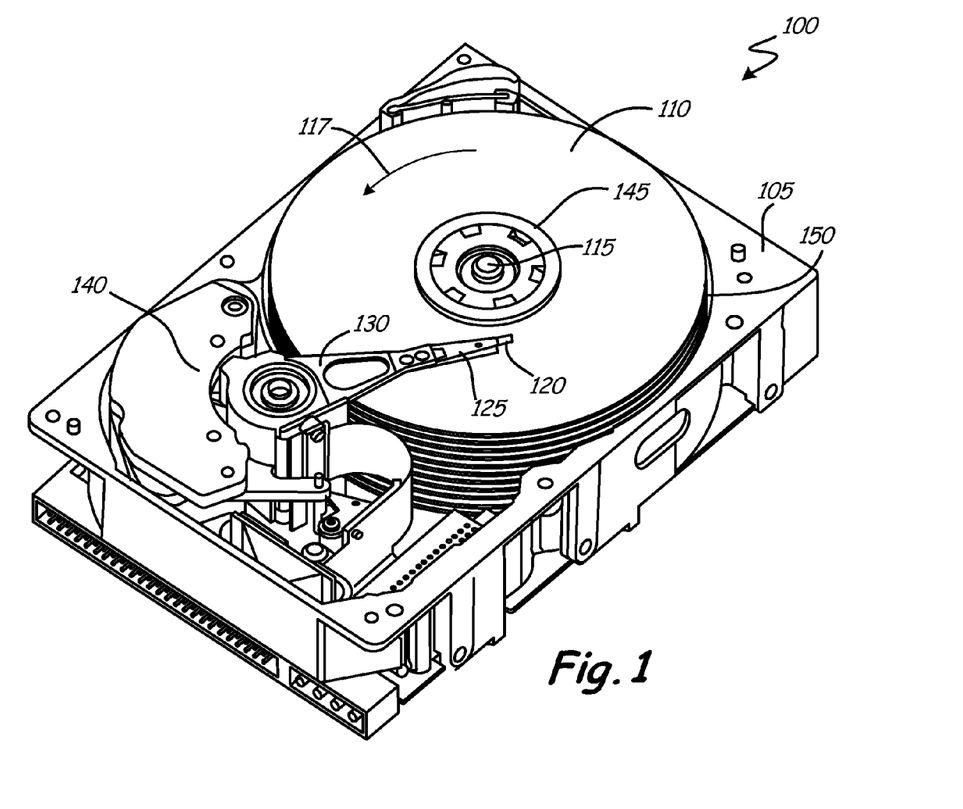
FIG. 1 is a perspective view of one embodiment of a data storage system.

FIG. 1 is a perspective view of a hard disc drive 100. Drive 100 is an example of a device in which some embodiments of the present disclosure may be incorporated. Hard disc drives are a common type of data storage system. While embodiments of this disclosure are described in terms of disc drives, other types of data storage systems should be considered within the scope of the present disclosure.

Disc drive 100 includes an enclosure 105. Disc drive 100 further includes a disc or medium 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated slider 120 that carries a recording head for communication with the surface of the disc. Each slider 120 is supported by a head gimbal assembly 125, which is in turn attached to an actuator arm 130. Each actuator arm 130 is rotated about a shaft by a voice coil motor assembly 140. As voice coil motor assembly 140 rotates actuator arm 130, slider 120 moves in a path between a disc inner diameter 145 and a disc outer diameter 150.

Figure 2:
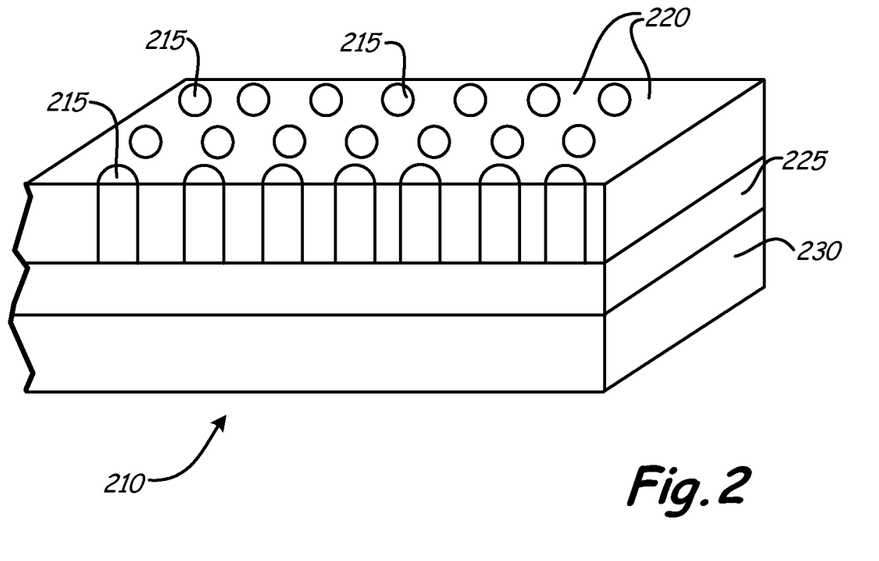
FIG. 2 is a simplified perspective view of a bit patterned data recording medium.

FIG. 2 is a simplified perspective view of a bit patterned medium 210. Medium 210 is illustratively a medium in a disc drive such as medium 110 in FIG. 1. Certain embodiments disclosed herein may be practiced with bit patterned media such as medium 210. Implementation with types and variations of bit patterned media other than the simplified variation shown in FIG. 2 are also within the scope of the present disclosure. Also, embodiments could just as easily be practiced with media having continuous magnetic surfaces such as, but not limited to, longitudinal or perpendicular media. Even though some embodiments are described in the context of continuous or bit patterned media, the present invention is not limited to any particular type or variation of media.

Medium 210 includes a plurality of media dots 215. Dots 215 are illustratively made from a magnetic material or materials. Dots 215 are separated from each other by a non-magnetic layer 220. Medium 210 also includes a soft magnetic underlayer 225 and a substrate 230.

Figure 3:
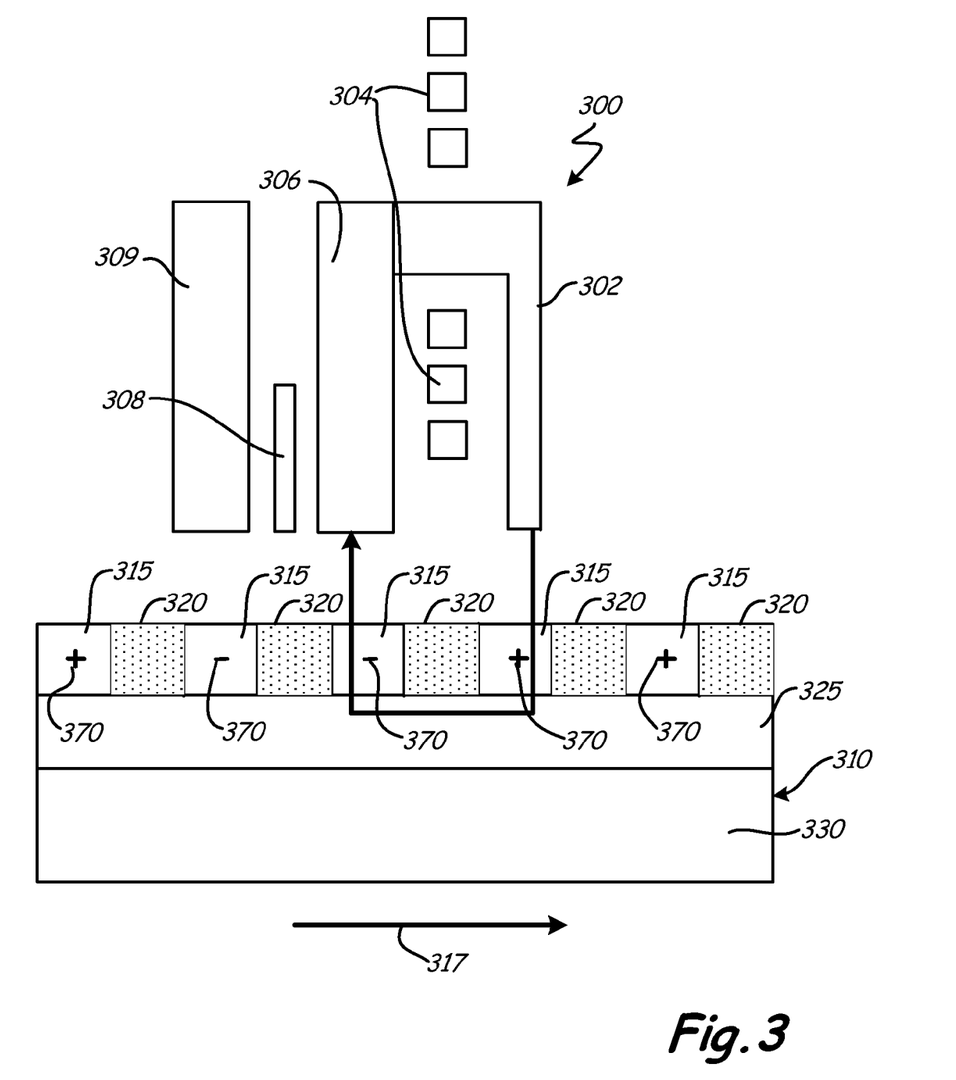
FIG. 3 is a schematic diagram of a cross-section of a recording head writing to a bit patterned data recording medium.

FIG. 3 is a schematic diagram of a cross-section of a recording head 300 writing to a bit patterned medium 310. Recording head 300 is illustratively carried by a slider such as slider 120 in FIG. 1, and bit patterned medium 310 is illustratively a storage medium such as, but not limited to, medium 110 in FIG. 1 and medium 210 in FIG. 2. FIG. 3 is a simplified diagram only showing cross-sectional views of some of the read and write components of a recording head. Those skilled in the art will recognize recording heads commonly include other components. Some embodiments of the present disclosure may be practiced with recording heads such as recording head 300. Embodiments of the present disclosure are however not limited to such recording heads. Many various types of recording heads are known in the art, and embodiments of the present disclosure are not limited to any specific type of recording head. Embodiments of the present disclosure are practiced in all types of recording heads.

Recording head 300 includes a write pole 302, a magnetization coil 304, a return pole 306, a read element 308, and a bottom shield 309. Storage medium 310 includes media dots 315 that are illustratively media dots such as dots 215 in FIG. 2, a non-magnetic layer 320 that is illustratively a non-magnetic layer such as layer 220 in FIG. 2, a soft magnetic underlayer 325 that is illustratively an underlayer such a underlayer 225 in FIG. 2, and a substrate 330 that is illustratively a substrate such as substrate 230 in FIG. 2. Storage medium 310 rotates in the direction shown by arrow 317. Arrow 317 is illustratively a direction of rotation such as arrow 117 in FIG. 1.

In one embodiment, electric current is passed through coil 304 to generate a magnetic field. The magnetic field passes from write pole 302, through media dots 315, into underlayer 325, and across to return pole 306. The polarity of the magnetic field is illustratively reversed by reversing the polarity of the electric current passed through coil 304. The magnetic field and its polarity illustratively record a magnetization pattern in media dots 315. Magnetization patterns of dots 315 are represented by the "+" and "−" signs 370.

Figure 4:
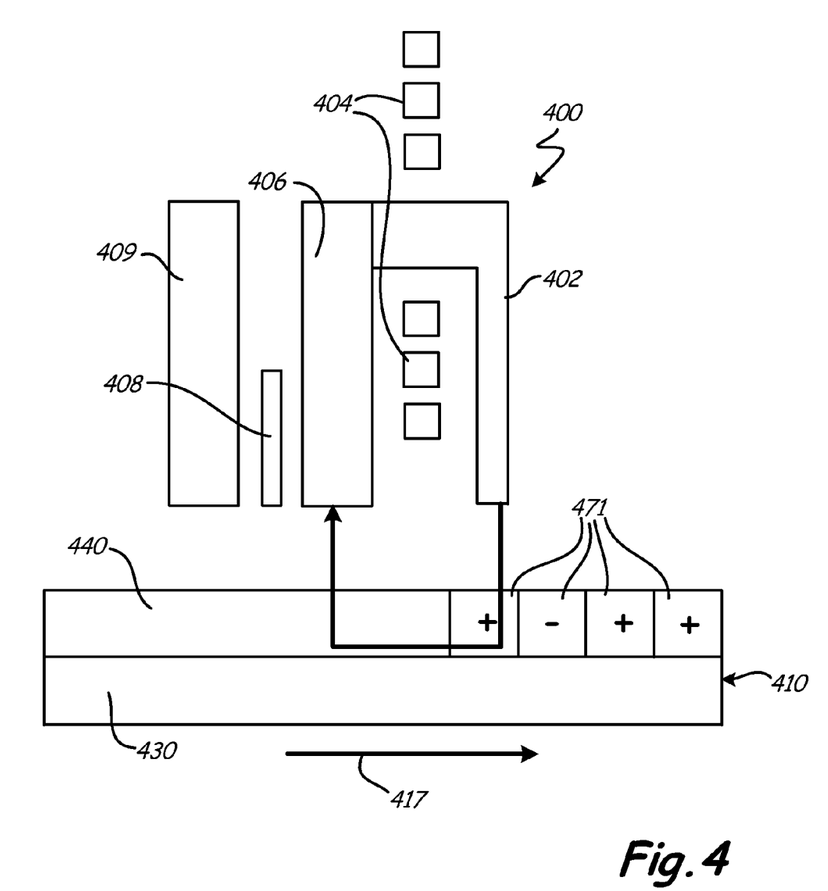
FIG. 4 is a schematic diagram of a cross-section of a recording head writing to a continuous recording medium.

FIG. 4 is a schematic diagram of a cross-section of a recording head 400 writing to a continuous medium 410. Medium 410 includes a substrate 430 and a continuous magnetic layer 440. FIG. 4 includes several elements that are analogous to those shown in FIG. 3 and is numbered accordingly. In FIG. 4, unlike in FIG. 3, the recording head is not recording magnetization patterns to a series of media dots.

Instead, recording head 400 is recording magnetization patterns to the continuous magnetic layer 440. The magnetization patterns of layer 440 are represented by the "+" and "−" signs 471. As is shown in the simplified diagram, the magnetization patterns are recorded in the continuous magnetic layer 440 and are not separated from each other by a nonmagnetic layer such as layer 320 in FIG. 3.

Figure 5:
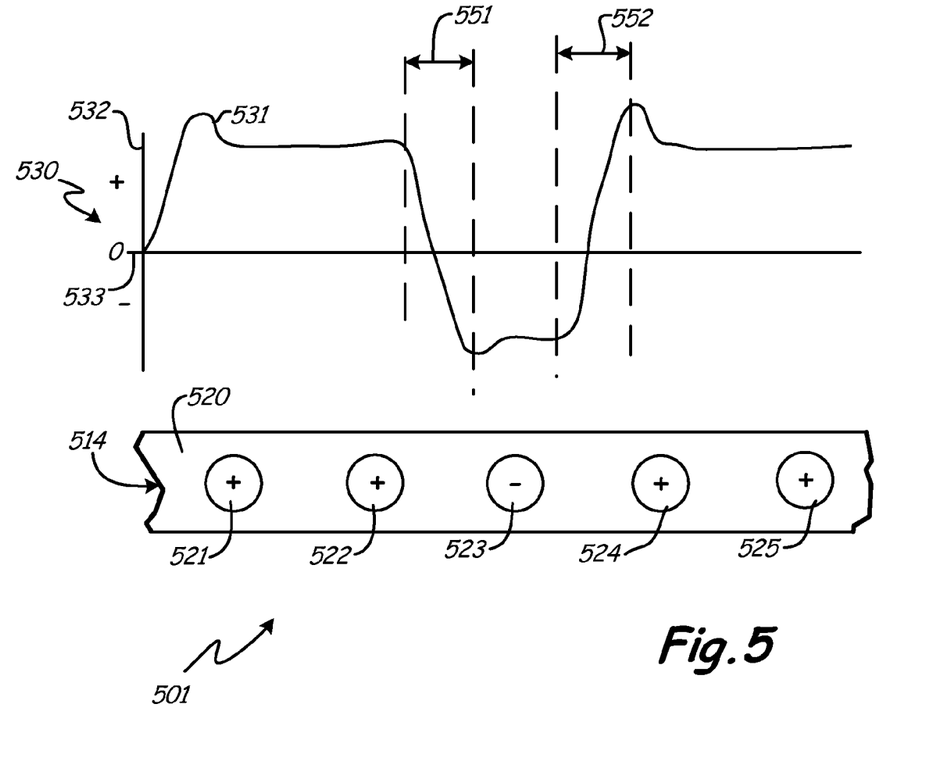
FIG. 5 is a schematic diagram of a non-pulse bit patterned medium writing process.

FIG. 5 is a schematic diagram of a non-pulse bit patterned media writing process 501. FIG. 5 includes a recording medium track 514 that includes a non-magnetic layer 520 and five media dots 521-525. Track 514 is illustratively a track of media dots in a medium such as medium 210 in FIG. 2 and medium 310 in FIG. 3. Track 514 is illustratively rotated beneath a recording head in a writing process such as in the process shown in FIG. 3.

FIG. 5 also includes a representation of a recording head writer magnetic field 530. Field 530 includes an intensity or amplitude 531. Amplitude 531 has an associated polarity represented by the vertical axis 532. Amplitudes above the center or zero line 533 have a positive polarity and those below the center line have a negative polarity. Field 530 is illustratively a magnetic field generated by a recording head writing element or writer as track 514 is rotated beneath the recording head.

In FIG. 5, track 514 and field 530 are aligned in the vertical direction. Each portion of field 530 represents the magnetic field generated as the portion of track 514 that is below it in the vertical direction passes beneath the magnetic field. For example, media dots 521, 522, 524, and 525 have "+" signs indicating that they have recorded and stored a positive magnetization pattern. These positive magnetization patterns correspond to the positive portions of magnetic field 530 shown above the media dots in the diagram. Similarly, media dot 523 has a "−" sign indicating that it has recorded and stored a negative magnetization pattern. This negative magnetization pattern corresponds to the negative portion of magnetic field 530 shown above the dot in the diagram.

FIG. 5 also includes a fall time 551 and a rise time 552. In FIG. 5, magnetic field 530 transitions from being a positive polarity field when it is writing to media dot 522 to being a negative polarity field when it is writing to media dot 523. Fall time 551 represents the amount of time needed for magnetic field 530 to switch from positive polarity to negative polarity. In FIG. 5, magnetic field 530 transitions from being a negative polarity field when it is writing to media dot 523 to being a positive polarity field when it is writing to media dot 524. Rise time 552 represents the amount of time needed for magnetic field 530 to switch from negative polarity to positive polarity.

It is worth noting that when magnetic field 530 writes the same magnetization pattern to adjacent media dots, that the magnetic field remains at the same polarity and at or approximately at the same intensity. For example, the adjacent media dots 521 and 522 have the same positive polarity. When field 530 writes to dots 521 and 522, it remains approximately constant. Similarly, adjacent dots 524 and 525 have the same polarity and field 530 remains approximately constant when writing to those dots.

It is also worth noting that although magnetic field 530 is shown in the context of writing to a bit patterned medium, magnetic field 530 is also illustrative of a magnetic field that writes to a continuous medium such as medium 410 in FIG. 4. In such a case, the magnetic field similarly remains constant or approximately constant while it is recording. Also in such a case, the magnetic field has rise and fall times that correspond to the amount of time needed for the magnetic field to switch polarity when it writes magnetization patterns with different polarities.

Figure 6:
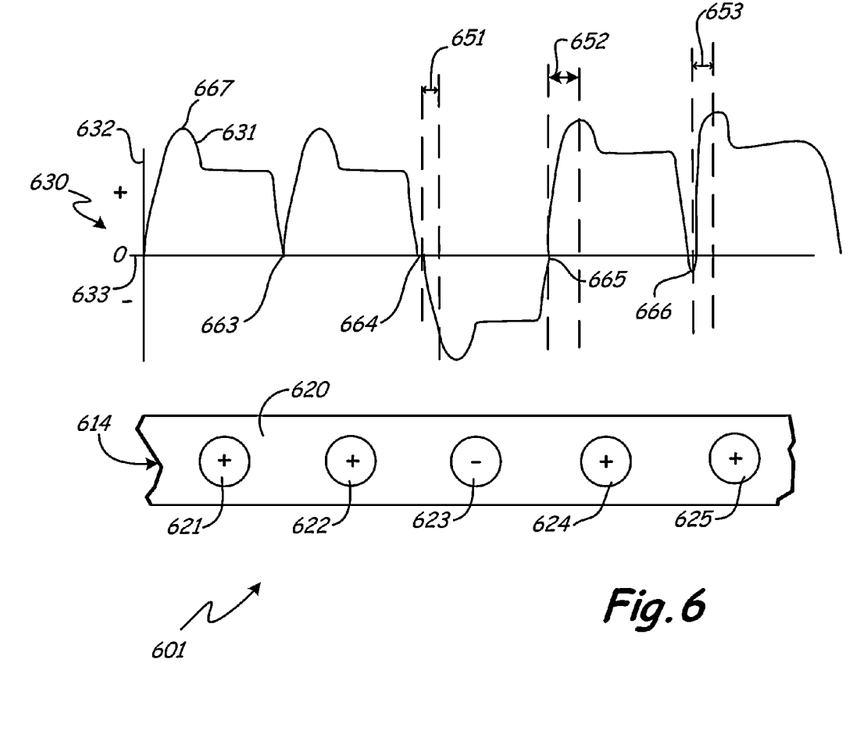
FIG. 6 is a schematic diagram of a pulse bit patterned medium writing process.

FIG. 6 is a schematic diagram of a pulse bit patterned medium writing process 601. FIG. 6 includes several of the same elements as FIG. 5 and is numbered accordingly. In FIG. 6, magnetic field 630 is writing the same magnetization pattern to media dots 621-625 as field 530 is writing to dots 521-525 in FIG. 5 (i.e. "+ + − + +"). Magnetic field 630 however differs from field 530 in several aspects.

First, magnetic field 630 does not remain constant or approximately constant as it writes to adjacent media dots. Instead, magnetic field 630 is de-saturated or approximately de-saturated between writing to adjacent media dots. FIG. 6 includes four de-saturation points 663, 664, 665, and 666. Point 663 corresponds to field 630 being de-saturated between writing to dots 621 and 622. Point 664 corresponds to field 630 being de-saturated between writing to dots 622 and 623. Point 665 corresponds to field 630 being de-saturated between writing to dots 623 and 624, and point 666 corresponds to field 630 being de-saturated between writing to dots 624 and 625. Point 667 corresponds to an overshoot peak of field 630 during saturation.

Embodiments of the present disclosure are not limited to any particular methods or devices for de-saturating a magnetic field. All methods and devices suitable to de-saturate a field are within the scope of the present invention. In one illustrative embodiment, a magnetic field is generated by applying current to coils in a recording head such as coils 304 in FIG. 3. The magnetic field is illustratively de-saturated by interrupting the power or current flow through the coils resulting in the magnetic field being reduced or eliminated. In some embodiments, the magnetic field is reduced such that it is at or approximately at zero. In other embodiments, the field is reduced such that there is under-shoot or over-shoot. De-saturation point 666 shows an illustration of under-shoot in that the magnetic field has a slightly negative polarity at de-saturation point 666.

In the pulse bit patterned media writing process shown in FIG. 6, the magnetic field is de-saturated between each media dot. Embodiments of the present disclosure are not however limited to such processes. In one embodiment, the magnetic field is de-saturated between writing magnetization patterns to media dots of opposite polarity such as between dots 622 and 623 or between dots 623 and 624. In another embodiment, the magnetic field is de-saturated between writing magnetization patterns to media dots of the same polarity such as between dots 621 and 622 or between dots 624 and 625. In yet other embodiments, various schemes of de-saturating are used such that the magnetic field is selectively de-saturated between media dots in any manner that is desired.

It is also worth noting that although pulse writing processes have been described as involving de-saturating one magnetic field, embodiments of the present disclosure are not limited to such a characterization. Pulse writing process 601 could alternatively be characterized as generating multiple magnetic fields. For example, process 601 could be viewed as generating a first magnetic field that records a magnetization pattern to dot 621. The first magnetic field could, for illustration purposes only and not by limitation, then be characterized as being de-saturated or ending at or approximately at point 663. Process 601 could then be viewed as repeating the generating and de-saturating of additional magnetic fields to write to each of media dots 622-625.

FIG. 6 shows simplified representations of fall time 651 and rise times 652 and 653. Fall time 651 corresponds to the amount of time needed for magnetic field 630 to switch from being positive polarity for writing to dot 622 to being negative polarity for writing to dot 623. Rise time 652 corresponds to the amount of time needed for magnetic field 630 to switch between being negative polarity for writing to dot 623 to being positive polarity for writing to dot 624. Rise time 653 corresponds to the amount of time needed for magnetic field 630 to transition between being a de-saturated or non-existent magnetic field at point 666 to being a positive field for writing to dot 625.

In an embodiment, rise and fall times in a pulse writing process such as times 651, 652, and 653 in FIG. 6 are shorter than rise and fall times in a non-pulse writing process such as times 551 and 552 in FIG. 5. Similarly, the dynamic field gradient or the rate at which the magnetic field increases is illustratively greater in pulse writing processes than in non-pulse writing processes.

FIG. 6 shows a pulse writing process in the context of writing to a bit patterned medium. The same pulse writing process and its several variations discussed above is also utilized in the context of writing to a continuous medium such as medium 410 in FIG. 4. In such a case, instead of the pulse writing process de-saturating between writing to media dots, the pulse writing process de-saturates as it writes to a continuous magnetic surface. The pulse writing process illustratively de-saturates between recording magnetization patterns that correspond to binary values. For example, in one embodiment, the magnetic field is illustratively de-saturated between writing a magnetization pattern for each binary value. In another embodiment, the magnetic field is de-saturated between writing magnetization patterns for different binary values (i.e. the field is de-saturated between writing a "1" and then a "0" or between writing a "0" and then a "1," or in other words, the field is de-saturated between writing a positive magnetization pattern and then a negative magnetization pattern or between writing a negative magnetization pattern and then a positive magnetization pattern). Embodiments include all variations of de-saturating the magnetic field when writing to a continuous medium, and include all other process variations described in the context of bit patterned media processes.

In pulse writing to a continuous medium, the rise and fall times such as times 651, 652, and 653 in FIG. 6 are illustratively reduced in the same or similar fashion as rise and fall times are reduced in writing to bit patterned media. Likewise, in some embodiments, the dynamic field gradient in pulse writing to a continuous medium is also increased.

Figure 7:
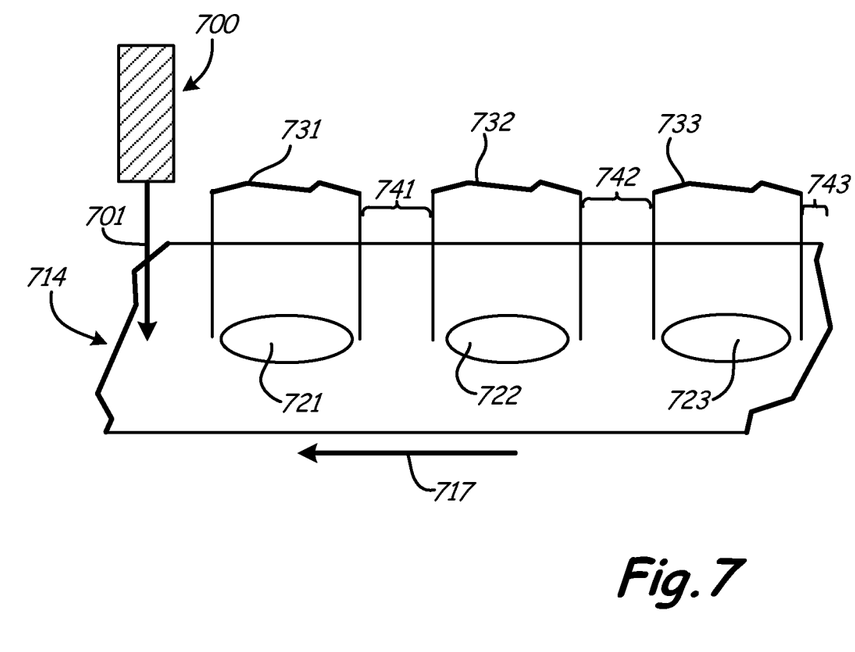
FIG. 7 is a simplified schematic diagram of timing windows in a bit patterned medium writing process.

FIG. 7 is a simplified schematic diagram of timing windows in a bit patterned medium writing process. In FIG. 7, recording head 700 generates a magnetic field 701 that writes to the bit patterned medium track 714. Track 714 illustratively passes beneath head 700 in the direction shown by the arrow 717. Track 714 is shown to have three media dots 721, 722, and 723. FIG. 7 is only a simplified diagram and those skilled in the art will recognize that track 714 can have any number of media dots. Each media dot has an associated synchronization timing window. Window 731 corresponds to dot 721. Window 732 corresponds to dot 722, and window 733 corresponds to dot 723. When a magnetic field is saturated within a timing window (i.e. the magnetic field is at the correct polarity and strength to write the intended magnetization pattern to the media dot), the correct magnetization pattern is written to the media dot.

FIG. 7 also shows possible error windows 741, 742, and 743. The error windows are outside of the synchronization windows. If a magnetic field is generated during these error windows, it is possible that an incorrect magnetization pattern will be written to a media dot. For example, if the intended polarity of dot 721 is positive and the intended polarity of dot 722 is negative, dot 722 may be written incorrectly (i.e. having positive polarity instead of negative) if the positive polarity magnetic field generated to write to dot 721 is continued into possible error window 741. Those skilled in the art will recognize that there are many possible reasons for this. For example, for illustration purposes only and not by limitation, the physical location of dot 722 relative to dot 721 may be closer than the target value. This could be caused for example by variations in the bit patterned media manufacturing process.

In at least some embodiments, pulse writing such as that shown in FIG. 6 provides improved synchronization timing window performance and/or improved possible error timing window performance as compared to non-pulse writing such as that shown in FIG. 5. For example, in one embodiment of pulse writing, the magnetization field is de-saturated between writing to adjacent or consecutive media dots. This reduces the amount of magnetic field generated during possible error timing windows, and reduces the likelihood of an incorrect magnetization pattern being recorded to a media dot. Also for example, in another embodiment of pulse writing, rise and fall times such as times 651, 652, and 653 in FIG. 6 are reduced in pulse writing as compared to non-pulse writing. In such a case, the magnetic field may become saturated within synchronization timing windows more quickly resulting in a more likely correct write.

In addition to the previously discussed advantages associated with at least some embodiments of pulse writing, it is also worth noting that in some embodiments that pulse writing improves power consumption in storage systems. In non-pulse writing, it is common that power is continually supplied to the recording head during writing in order to generate a magnetic field. In an embodiment of pulse writing, power is not continually supplied to the recording head. Instead, the magnetization coil power or current flow is interrupted (i.e. stopped or ended) or reduced to de-saturate the magnetic field during writing. This results in lower power consumption.

As has been previously mentioned or at least alluded to, although some embodiments of pulse writing have been described in the context of bit patterned media and/or in the context of continuous media, embodiments of pulse writing are not limited to the context in which they were described. Embodiments of pulse writing are not limited to only bit patterned media, continuous media, or in fact to any particular media or storage device. Embodiments of pulse writing are practiced with all types and variations of media and storage devices.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hard disc drives, it will be appreciated by those skilled in the art that the teachings of the disclosure can be applied to other types of data storage systems, without departing from the scope and spirit of the disclosure.

What is claimed is:
1. An apparatus comprising:
 a recording medium having media dots that are separated from each other by regions of non-magnetic material, each media dot being associated with a timing window, and each region of non-magnetic material being associated with an error window; and a device configured to saturate a writing element within each of the timing windows and configured to de-saturate the writing element within each of the error windows, wherein the device is further configured to saturate the writing element by generating a same polarity magnetic field in the writing element during substantially entire time durations of consecutive ones of the timing windows corresponding to at least two adjacent ones of the media dots and configured to de-saturate the writing element within an error window between the consecutive timing windows for a time duration that is substantially smaller than a time duration of an individual one of the consecutive timing windows.

2. The apparatus of claim 1 wherein the recording medium comprises a soft magnetic layer that is beneath the media dots and the regions of non-magnetic material.

3. The apparatus of claim 2 wherein the recording medium comprises a substrate that is beneath the soft magnetic layer.

4. The apparatus of claim 1 wherein the device configured to saturate the writing element within each of the timing windows comprises a current conductor configured to generate positive polarity magnetic fields in the writing element within some of the timing windows, and configured to generate negative polarity magnetic fields in the writing element within other ones of the timing windows.

5. A method comprising:
saturating a magnetic field for a substantially entire time duration within each of at least two consecutive timing windows associated with corresponding different ones of at least two adjacent media dots, the magnetic field having a same polarity in the at least two consecutive timing windows; and
de-saturating the magnetic field within an error window that is located between the at least two consecutive timing windows for a time duration that is substantially smaller that the time duration of each of the at least two consecutive timing windows.

6. The method of claim 5 wherein de-saturating comprises de-saturating the magnetic field at a de-saturation point that is within the error window.

7. The method of claim 5 wherein de-saturating the magnetic field comprises interrupting a current flow.

8. The method of claim 5 wherein de-saturating the magnetic field comprises reducing a strength of the magnetic field.

9. A device comprising:
a recording medium that includes a track of media dots, each media dot being associated with a timing window, and an area between two adjacent ones of the media dots being associated with an error window; and
a writing element configured to generate a magnetic field that is saturated within the timing windows and that is de-saturated within the error window,
wherein the writing element is further configured to generate a same polarity magnetic field during substantially entire time durations of consecutive ones of the timing windows corresponding to the two adjacent ones of the media dots and configured to de-saturate the writing element within the error window between the consecutive timing windows for a time duration that is substantially smaller than a time duration of an individual one of the consecutive timing windows.

10. The device of claim 9 wherein the magnetic field has opposite polarities for at least two other adjacent media dots in the track of media dots.

11. The device of claim 10 wherein the writing element generates magnetic field overshoot for at least a portion of the timing windows.

12. The device of claim 9 wherein the writing element generates magnetic field undershoot for at least a portion of the error window.

* * * * *